Nov. 9, 1965 K. L. KOTZEBUE ETAL 3,217,259

RECEIVER UTILIZING PHASE-LOCKED PARAMETRIC AMPLIFIER

Filed July 6, 1959

INVENTORS
KENNETH L. KOTZEBUE
& LAWRENCE A. BLACKWELL
BY
*Stevens, Davis, Miller & Mosher*
ATTORNEYS United States Patent Office 3,217,259
Patented Nov. 9, 1965

3,217,259

RECEIVER UTILIZING PHASE-LOCKED PARAMETRIC AMPLIFIER

Kenneth L. Kotzebue, 2809 Daniels, and Lawrence A. Blackwell, 7319 Lakewood, both of Dallas, Tex.

Filed July 6, 1959, Ser. No. 825,018
2 Claims. (Cl. 325—421)

This invention relates to signal receiving systems, and more particularly to systems for receiving extremely weak signals such as those transmitted from space vehicles.

Signal receiving systems for space vehicle communications have heretofore been proposed, illustrative of which is that described in an article entitled "Microlock: A Minimum Weight Radio Instrumentation System for a Satellite," by Henry L. Richter, Jr., William F. Sampson and Robertson Stevens, published in the August 1958 issue of "Jet Propulsion," a publication of the American Rocket Society. As disclosed in FIGURE 2 of that article, a phase-locked loop is employed to maintain the output of a local oscillator in frequency synchronism and in substantially constant phase relationship with the incoming signal, thereby permitting the utilization of an extremely narrow bandwidth filter which excludes a major portion of the noise that may be received along with the signal.

Although through the utilization of the vary narrow bandpass filter a major part of the received noise can be eliminated, the noise which is received at signal frequency is amplified with the same gain as that of the signal itself, and no reduction in signal-to-noise ratio is achieved in the amplifier. Consequently, the signal-to-noise ratio is no better at the output of the amplifier than it is at the input and reduction in noise accurs entirely by virtue of the narrow pass characteristics of the previously mentioned filter.

With systems of the type described in the above identified article, signals from small transmitters such as those employed in space vehicles previously launched can be received from distances as far as 490,000 miles. However, since it is desired to receive signals from distances many times greater than this, it has been recognized that improvements must be made either in the receiving equipment, or in the transmitter, or both.

It will be immediately recognized that one approach to solving the problem is that of raising the power of the transmitter. However, since increasing the power of the transmitter would involve an increase in weight, and since it is known that the weight of space vehicles must be minimized, it has been sought to solve the problem of reception from greater distances by improving the signal receiving equipment.

It is one object of this invention to produce a sensitive receiver capable of tracking space vehicles to distances many times greater than those over which signals have heretofore been satisfactorily received.

It is yet another object of this invention to produce a sensitive signal receiver in which signal-to-noise ratio is improved over that existing at the input thereof.

Consequently, in accordance with one feature of the invention, a parametric amplifier is advantageously employed to exhibit different degrees of amplification for a received signal and for accompanying noise.

In accordance with another feature of the invention, the parametric amplifier is phase-locked to the incoming signals in such manner that the amplification of the received signal is greater than the amplification of the accompanying noise, thereby resulting in an improved signal-to-noise ratio at the amplifier output.

These and other objects and features of the invention will be apparent from the following detailed description, by way of example, with reference to the drawing, in which.

Figure 1:
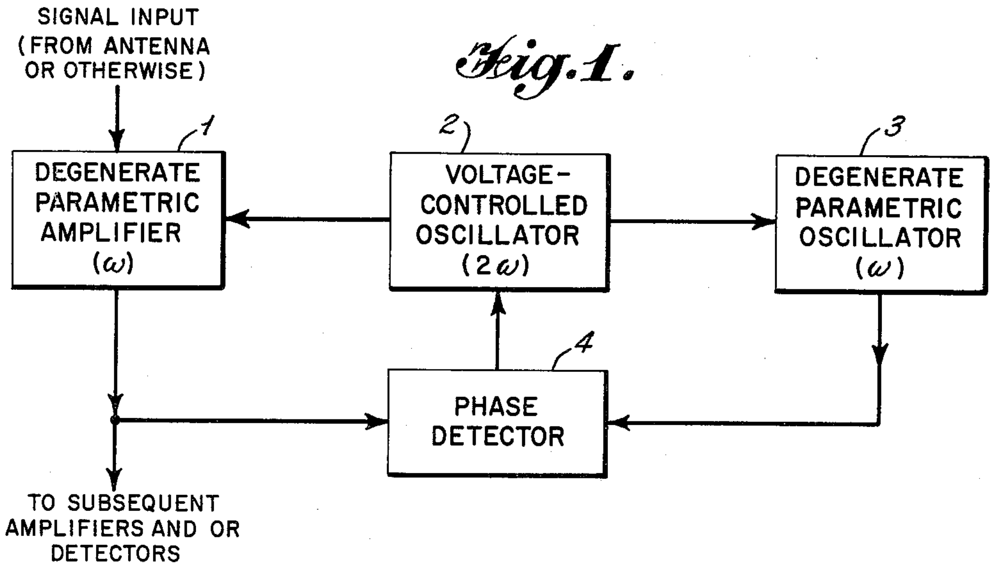
FIG. 1 is a block diagram of one simplified embodiment of the invention.

Now turning to the drawing, and more particularly to FIG. 1 thereof, it will be noted that there is therein depicted a degenerate parametric amplifier 1 operating at the signal frequency $\omega$. Supplying pump power to this amplifier is a voltage-controlled oscillator 2 operating at a frequency of $2\omega$. Also receiving power from the pump oscillator is a degenerate parametric oscillator 3 which is phase-locked to the pump oscillator 2 over the obvious path. Oscillator 3 produces a signal at frequency $\omega$ which is conducted over the obvious path to the phase detector 4. There the amplified signal from amplifier 1 is phase-compared with the signal from oscillator 3, and a D.C. voltage proportional to the phase difference is produced and impressed upon the pump oscillator 2 to maintain it in a phase-locked relationship with the incoming signal.

As is well known to those familiar with parametric amplifiers, the degenerate form thereof exhibits an amplification characteristic which is phase sensitive. That is, even though a signal may be impressed upon the amplifier at one-half the frequency of the pump, unless it is introduced in proper *phase relationship* to the pump signal, it will not receive maximum amplification. Thus, for example, a signal will be amplified to the maximum when it bears a zero or 180° phase relationship to a hypothetical signal which would be derived at one-half pump frequency from the pump oscillator without phase displacement. Furthermore, the greater the degree of phase displacement of the incoming signal from that of the heretofore mentioned hypothetical signal, the less the degree of amplification accorded it within the amplifier.

It will now be apparent that by locking the pump oscillator to the incoming signal, the signal itself may be made variable to represent transmitted intelligence and that the pump oscillator will maintain a substantially optimum phase displacement relationship thereto, thereby maintaining the amplification of the incoming signal at a maxmum irrespective of the excursions it may make from its unmodulated state. It will also be apparent that only that noise having *both* the critical frequency and proper phase relationship will be accorded the same degree of amplification as that of the signal, and that therefore the system of FIG. 1 is susceptible not only of the techniques employed in the prior art to minimize noise (through narrow band-width loop filters), but that in addition it employs an advantageous characteristic of degenerate parametric amplifiers in applications not heretofore proposed.

It should be emphasized at this point that the inventive concept is not deemed to reside in any particular internal disposition of the degenerate parametric amplifier circuits themselves, nor is it felt to reside in either of the oscillators or in the phase detector per se. On the contrary, it is the particular cooperative association of these elements to produce new, unexpected and improved results that is felt to exemplify the essence of his invention. Consequently, and in view of the fact that circuits for oscillators, phase detectors, and degenerate parametric amplifiers themselves are well known in the art, it is desired not to obscure the essence of the invention by the inclusion of specific circuits. If one should desire to make reference to sources where such circuits may be found, he may examine any one of a wide variety of reference materials among which are:

Heffner & Wade, "Gain, Bandwidth and Noise Characteristics of the Variable Parameter Amplifier," J. Appl. Phys., vol. 29, pp. 1321–1331, September 1958;
R. H. Dishington, "Diode Phase Discriminators," Proc. IRE, vol. 37, p. 1401, December 1949; and
E. L. Ginzton, "Microwave Measurements," McGraw-Hill, New York, 1957.

Figure 2:
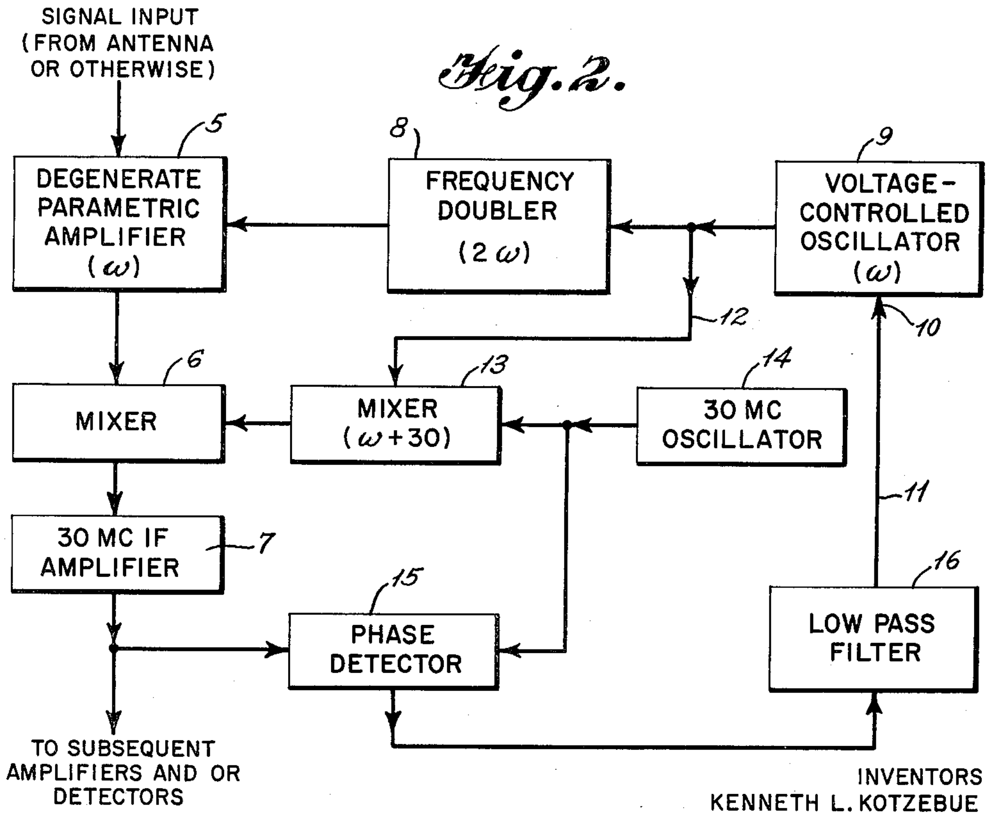
FIG. 2 is another embodiment which may find more advantageous application at higher signal frequencies.

Although the diagram of FIG. 1 is believed to clearly disclose the essence of the invention, there may arise specific applications in which modifications thereof are advantageous. Thus, for example, if microwaves of very high frequency are employed as the incoming signals, it may be necessary to convert such signals to corresponding signals at intermediate frequency; and it may then be further needed to utilize such intermediate frequency signals as the media from which the error-correcting voltage may be obtained through phase detector circuits. Such an arrangement is shown in FIG. 2, the elements and operation of which may be described as follows.

When a signal is received from the antenna or other source, it is introduced to the degenerate parametric amplifier 5 where it undergoes amplification before being impressed upon an input terminal of a mixer 6. Although mixer 6 may be any one of a variety of circuits well known in the art, it may at frequencies contemplated be advantageous to utilize the crystal type since it has been found to offer advantages at microwave frequencies. In any event, irrespective of the type of mixer employed, an output signal is produced by mixer 6 and transmitted over the obvious path to the 30 megacycle IF amplifier 7.

The frequency doubler 8 which produces an output at a frequency of $2\omega$ and is driven by voltage-controlled oscillator 9 which, in turn, is locked to the incoming signal $\omega$ by a phase-error correcting voltage transmitted to input terminal 10 over loop 11.

The output of oscillator 9 is additionally conducted over path 12 to mixer 13 where it is beat against a 30 megacycle input signal received from the 30 megacycle oscillator 14. A filter is employed within mixer 13 to pass only the modulation product $\omega+30$ megacycles to mixer 6, thereby preventing the subsequent mixing of unwanted modulation products.

It will now be apparent that the two signals introduced to mixer 6 are: (1) a signal at $\omega$ which has been amplified by amplifier 5, and (2) a signal at $\omega+30$ megacycles. Consequently, the output from mixer 6 will include a signal of 30 megacycles which varies from the 30 megacycle signal produced by oscillator 14 only to the extent by which the incoming signal from the antenna varies from the signal produced by oscillator 9. This signal, i.e., the 30 megacycle signal produced by mixer 6, is passed through amplifier 7 to phase detector 15 where it is compared in phase with the signal produced by 30 megacycle oscillator 14. Detector 15 produces an output direct current voltage proportional to the phase difference. This error voltage is passed through low pass filter 16, thereby to eliminate noise or other undesired components, before being conducted over loop 11 to input terminal 10 of voltage-controlled oscillator 9. At oscillator 9, the error voltage produces the required correction to prevent any substantial excursion in phase by oscillator 9 from the phase of the signal received from the antenna, thereby locking oscillator 9 in phase and frequency relationship with the incoming signal.

It will now be apparent that phase-locking has been accomplished by the advantageous employment of intermediate frequencies which are more easily handled in mixer and detector circuits. It may, however, be questioned as to whether or not the utilization of mixer and intermediate frequency circuits would introduce errors which might render the circuits less advantageous than those in which original frequencies were employed. Thus, for example, it might be questioned whether or not frequency stabilization of the 30 megacycle oscillator 14 would be an important factor in maintaining an exact phase relationship between the oscillator 9 and the degenerate amplifier 5. However, an inspection of the circuits will reveal that any frequency deviation by oscillator 14 from its nominal rating of 30 megacycles would not introduce any error in the phase detector output voltage from detector 15 since any excursion in frequency by oscillator 14 would be reflected in both of the input signals to detector 15 and would there be canceled out.

After the signal has been advantageously amplified by the circuits of this invention, it may be introduced to conventional amplifiers for additional boost in level, or it may be suitably detected. Thus the signal may be processed by conventional sensing equipment (not shown) to extract information represented by signal frequency (such as that of Doppler shift), phase or amplitude.

While we have presented our invention in one illustrative embodiment, it will be apparent to one skilled in the art that various modifications and adaptations may be employed without departing from the spirit or scope thereof.

The words and expressions employed are intended as terms of description and not of limitation, and there is no intention in the use thereof of excluding any and all equivalents, adaptations and modifications.

What is claimed is:

1. In combination, a degenerate parametric amplifier having a signal input terminal, an output terminal, and a pump signal input terminal, first means for supplying a first signal at a first frequency to said signal input terminal, a voltage-controlled oscillator operating at the frequency of said first signal, means including a frequency doubler connected to said voltage-controlled oscillator for supplying a pump signal at twice said first frequency to said pump input terminal, another oscillator, a first mixer connected to the output terminals of said voltage-controlled oscillator and said another oscillator effective to produce a mixed signal having sum and difference modulation products, a second mixer connected to the output of said first mixer and to the output of said amplifier for producing a signal substantially at the frequency of said another oscillator, a first amplifier connected to the output of said second mixer for amplifying the output from said second mixer, a phase detector connected to the output of said first amplifier and said another oscillator for deriving an output voltage proportional to the difference in phase between the output of said another oscillator and the signal received from said first amplifier, and means interconnecting the output of said phase detector with said voltage-controlled oscillator to compensatorily change the phase relationship of said voltage controlled oscillator and said degenerate parametric amplifier when the phase of the signal applied to said degenerate parametric amplifier changes thereby to lock said voltage-controlled oscillator in phase synchronism therewith.

2. Signal translating apparatus comprising:

(a) a parametric amplifier having a signal input, an output, and a pump input, (b) means for supplying a signal to said signal input at a signal frequency, (c) a voltage controlled oscillator operating at said signal frequency and having an output and a control input, (d) a frequency doubler having an input connected to the output of said voltage-controlled oscillator having an output connected to said pump input, (e) a second oscillator having an output and operating at a given frequency, (f) a first mixer having one input connected to the output of said voltage-controlled oscillator and another input connected to the output of said second oscillator, (g) second mixing means having one input connected to the output of said parametric amplifier and another input connected to the output of said first mixer, said mixing means being adapted to produce an output at said given frequency, (h) a phase detector having one input connected to the output of second oscillator and another input connected to receive the output of said second mixing means, said phase detector being adapted to produce an output voltage related to the phase relationship of signals at its inputs, (i) and means connecting the output voltage of said phase detector to the control input of said voltage-controlled oscillator.

References Cited by the Examiner

UNITED STATES PATENTS

| | | | |
|---|---|---|---|
| 2,505,043 | 4/50 | Guanella | 325—434 |
| 2,640,155 | 5/53 | Rambo | 331—25 |
| 2,958,045 | 10/60 | Anderson | 330—5 |

DAVID G. REDINBAUGH, *Primary Examiner.*

KATHLEEN H. CLAFFY, CHESTER L. JUSTUS, FREDERICK M. STRADER, E. JAMES SAX, *Examiners.*